(12) United States Patent
Zhao et al.

(10) Patent No.: US 10,242,644 B2
(45) Date of Patent: Mar. 26, 2019

(54) TRANSMITTING DISPLAY DATA

(71) Applicant: INTEL CORPORATION, Santa Clara, CA (US)

(72) Inventors: Zhe Zhao, Cupertino, CA (US); Quang T. Le, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 120 days.

(21) Appl. No.: 15/282,777

(22) Filed: Sep. 30, 2016

(65) Prior Publication Data

US 2018/0096667 A1 Apr. 5, 2018

(51) Int. Cl.
*G09G 5/00* (2006.01)
*H04N 19/91* (2014.01)
*G06T 1/60* (2006.01)
*G09G 5/04* (2006.01)

(52) U.S. Cl.
CPC ............... *G09G 5/006* (2013.01); *G06T 1/60* (2013.01); *G09G 5/04* (2013.01); *H04N 19/91* (2014.11); *G09G 2340/02* (2013.01); *G09G 2352/00* (2013.01); *G09G 2360/122* (2013.01)

(58) Field of Classification Search
CPC ........... G09G 5/006; H04N 19/91; G06T 1/60
See application file for complete search history.

(56) References Cited

U.S. PATENT DOCUMENTS

| 5,931,922 A * | 8/1999 | Hough | H04N 7/17336 348/E7.073 |
| 6,529,935 B1 * | 3/2003 | MacInnis | G06T 9/00 345/530 |
| 6,947,604 B2 * | 9/2005 | Lippincott | G06T 9/005 358/426.16 |
| 2007/0046684 A1 * | 3/2007 | Jeffrey | G09G 5/39 345/572 |
| 2009/0284445 A1 * | 11/2009 | Kuo | H05B 33/0857 345/46 |
| 2014/0160139 A1 * | 6/2014 | MacInnis | H04N 19/46 345/545 |

* cited by examiner

*Primary Examiner* — Samantha (Yuehan) Wang
*Assistant Examiner* — Michael Le
(74) *Attorney, Agent, or Firm* — International IP Law Group, P.L.L.C.

(57) ABSTRACT

In some examples, a system can include a microcontroller to initialize a counter to a predetermined value for each image component of an image data slice. The microcontroller can also store a number of received bits for each image component in a data structure and generate a pre-allocation signal indicating that additional bits of data for one of the image components are to be requested and stored in the data structure, wherein the pre-allocation signal is to be generated in response to determining that the counter is below the predetermined value. The microcontroller can also increase the counter by the predetermined value and transmit an address from the data structure to a display device in response to detecting a valid signal.

16 Claims, 4 Drawing Sheets

TRANSMITTING DISPLAY DATA

TECHNICAL FIELD

This disclosure relates generally to transmitting display data, but not exclusively, to transmitting compressed display data.

BACKGROUND

Computing devices can use display controllers to transmit data to a display device using any number of standards and protocols. For example, a display controller can use display stream compression, such as a video electronics standards association (VESA) standard, to increase the bandwidth of data transmitted to display devices with higher display resolutions. In some examples, the display stream compression can convert red, green, and blue pixel values to a luma component (Y) and a chroma component (Co/Cg). The luma component and the chroma component can be separately compressed and the compressed bits can be organized into a standard unit or number of bits referred to herein as a multiplexor word or mux word.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
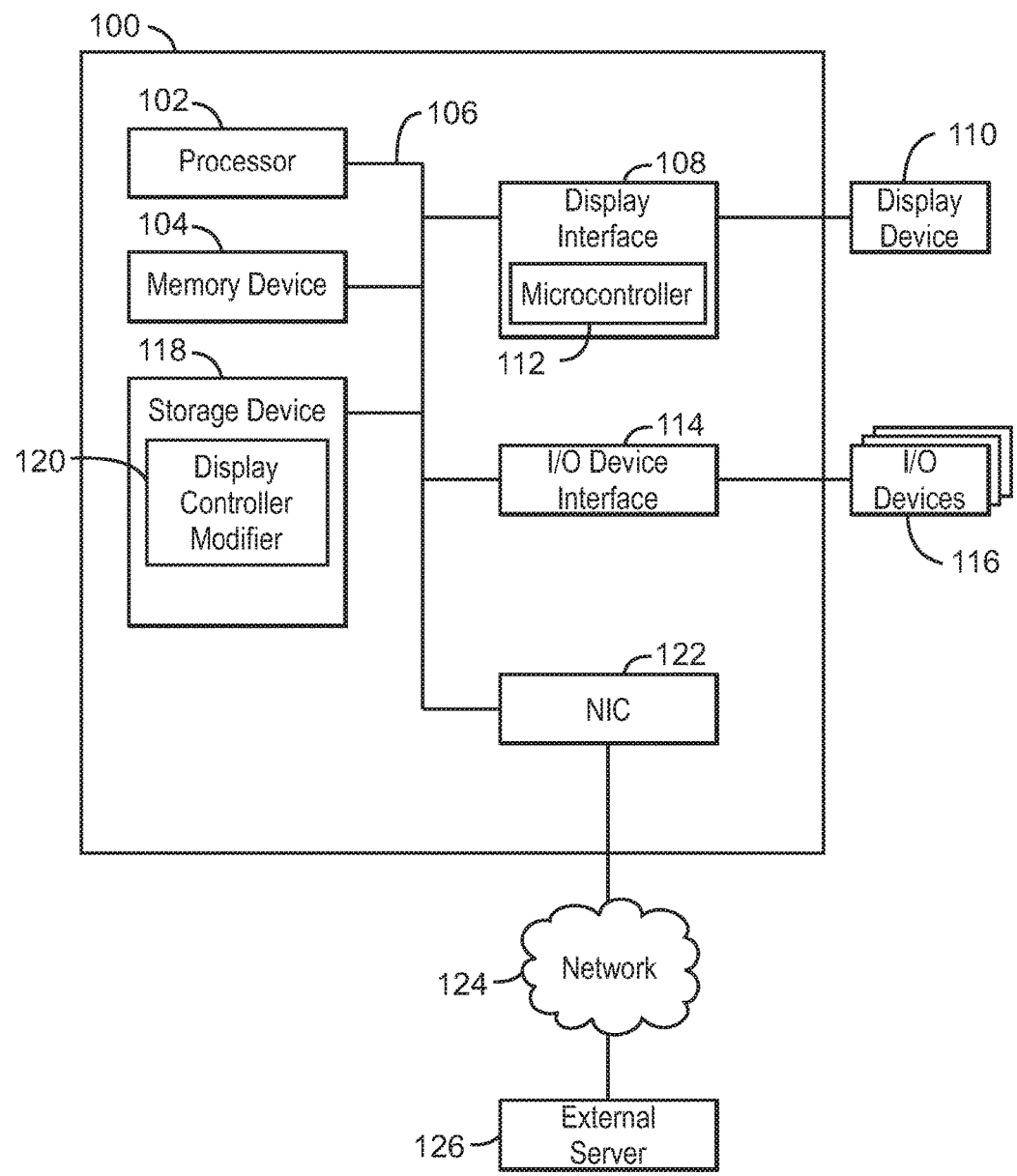
FIG. 1 illustrates a block diagram of a computing device that can transmit display data.

As discussed above, a display controller can compress display data by converting red, green, and blue pixel values into luma and chroma values. A decoder in the display controller can then detect a stream of display data values transmitted in predetermined sets referred to as multiplexor words. In some examples, a decoder can include three separate first-in first-out queues that each store separate luma (Y) and chroma (Co, CG) values. For example, a decoder can receive a continuous stream of data values for images to be transmitted to and displayed by a display device. The stream of data values can be organized and separated into multiplexor words, wherein the first multiplexor words of a continuous stream can include luma (Y) and chroma (CO, CG) values. In some examples, chroma values include chrominance green (Cg) and chrominance orange (Co) values. Following the first multiplexor word of data, a decoder can request a multiplexor word of data based on data values the decoder needs for decompression. The techniques incorporated by decoders, such as using three separate queues to store data values, can result in deadlock. For example, deadlock can occur if one of the three queues of data values has less than one multiplexor word of data values and one of the three queues is full.

Techniques described herein can prevent deadlock and enable a display controller to transmit display data to a display device. In some embodiments, a display controller can include a microcontroller to compress data to be transmitted to a display device using techniques described herein. For example, the microcontroller can initialize a counter to a predetermined value for each image component of an image data slice An image component, as referred to herein, can include a luma (Y), chrominance green (Cg), or chrominance orange (Co) value. In some examples, each frame of video or image is separated into subsets referred to herein as data slices. The microcontroller can store a number of received bits for each image component in a data structure, wherein the counter is to be reduced based on the number of received bits. In some examples, the microcontroller stores values for three different image components in a single data structure.

In some embodiments, the microcontroller can also generate a pre-allocation signal indicating that additional bits of data for one of the image components are to be requested and stored in the data structure. In some examples, the pre-allocation signal can be generated in response to determining that the counter is below the predetermined value or number of bits in a multiplexor word. Furthermore, the microcontroller can increase the counter by the predetermined value and transmit an address from the data structure to a display device in response to detecting a valid signal. An address, as referred to herein, can indicate values corresponding to one image component. The techniques described herein can implement data compression with a single data structure, such as a queue, among others. The techniques can also pre-allocate an address that is to be requested for each luma or chroma value.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

FIG. 1 is a block diagram of an example of a computing device that can transmit display data. The computing device 100 may be, for example, a mobile phone, laptop computer, desktop computer, or tablet computer, among others. The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory, read only memory, flash memory, or any other suitable memory systems. The instructions that are executed by the processor 102 may be used to implement a method that can transmit display data.

The processor 102 may also be linked through the system interconnect 106 (e.g., PCI®, PCI-Express®, NuBus, etc.) to a display interface 108 adapted to connect the computing device 100 to a display device 110. The display device 110 may include a display screen that is a built-in component of the computing device 100. The display device 110 may also include a computer monitor, television, or projector, among others, that is externally connected to the computing device 100. The display device 110 can include light emitting diodes (LEDs), and micro-LEDs, among others.

In some embodiments, the display interface 108 can include a microcontroller 112 that can initialize a counter to a predetermined value for each image component of an image data slice. For example, the microcontroller 112 can initialize a counter to a number of bits used to access a memory address by a multiplexor in the display interface 110. The microcontroller 112 can also store a number of received bits for each image component in a data structure, wherein the counter is to be reduced based on the number of received bits. For example, the microcontroller 112 can use a queue, or any other data structure, to store values corresponding to bits for luma values, bits for chrominance orange values, and bits for chrominance green values. The microcontroller 112 can also generate a pre-allocation signal indicating that additional bits of data for one of the image components are to be requested and stored in the data structure. In some examples, the pre-allocation signal is generated in response to determining that the counter is below the predetermined value. For example, the microcontroller 112 can determine that the data structure has stored a number of luma bits, chrominance orange bits, or chrominance green bits that is below a threshold value. In some examples, the threshold value is the number of bits in a multiplexor word. Furthermore, the microcontroller 112 can increase the counter by the predetermined value and transmit an address from the data structure to a display device in response to detecting a valid signal. For example, the microcontroller 112 can determine that a number of bits for each image component indicate that a valid signal is to be generated and bits for each image component are to be transmitted to a display device. In some embodiments, the microcontroller 112 generates the valid signal when more than a multiplexor word of bits for an image component have been accumulated or when the end of a data slice is reached.

The processor 102 may be connected through a system interconnect 106 to an input/output (I/O) device interface 114 adapted to connect the computing device 100 to one or more I/O devices 116. The I/O devices 116 may include, for example, a keyboard and a pointing device, wherein the pointing device may include a touchpad or a touchscreen, among others. The I/O devices 116 may be built-in components of the computing device 100, or may be devices that are externally connected to the computing device 100.

In some embodiments, the processor 102 may also be linked through the system interconnect 106 to a storage device 118 that can include a hard drive, an optical drive, a USB flash drive, an array of drives, or any combinations thereof. In some embodiments, the storage device 118 can include any suitable applications. In some embodiments, the storage device 118 can include a display controller modifier 120. In some embodiments, the display controller modifier 120 can store the instructions performed by the microcontroller 112. For example, the display controller modifier 120 may provide firmware to the microcontroller 112 during an initialization or boot process. The microcontroller 112 can then execute the firmware to implement the techniques described herein. In other embodiments, the firmware for the microcontroller can be stored locally on read only memory in the microcontroller 112, or in any other suitable storage device.

In addition, a network interface controller (also referred to herein as a NIC) 122 may be adapted to connect the computing device 100 through the system interconnect 106 to a network 124. The network 124 may be a cellular network, a radio network, a wide area network (WAN), a local area network (LAN), or the Internet, among others.

The network 124 can enable data to be transmitted between the computing device 100 and an external server 126. In some embodiments, the external server 126 can provide a service for the computing device 100.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, additional modules, additional network interfaces, etc.). Furthermore, any of the Functionalities of the microcontroller 112 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the microcontroller 112 can be implemented with logic, wherein the logic, as referred to herein, can include any suitable hardware (e.g., a processor, among others), software (e.g., an application, among others), firmware, or any suitable combination of hardware, software, and firmware.

Figure 2:
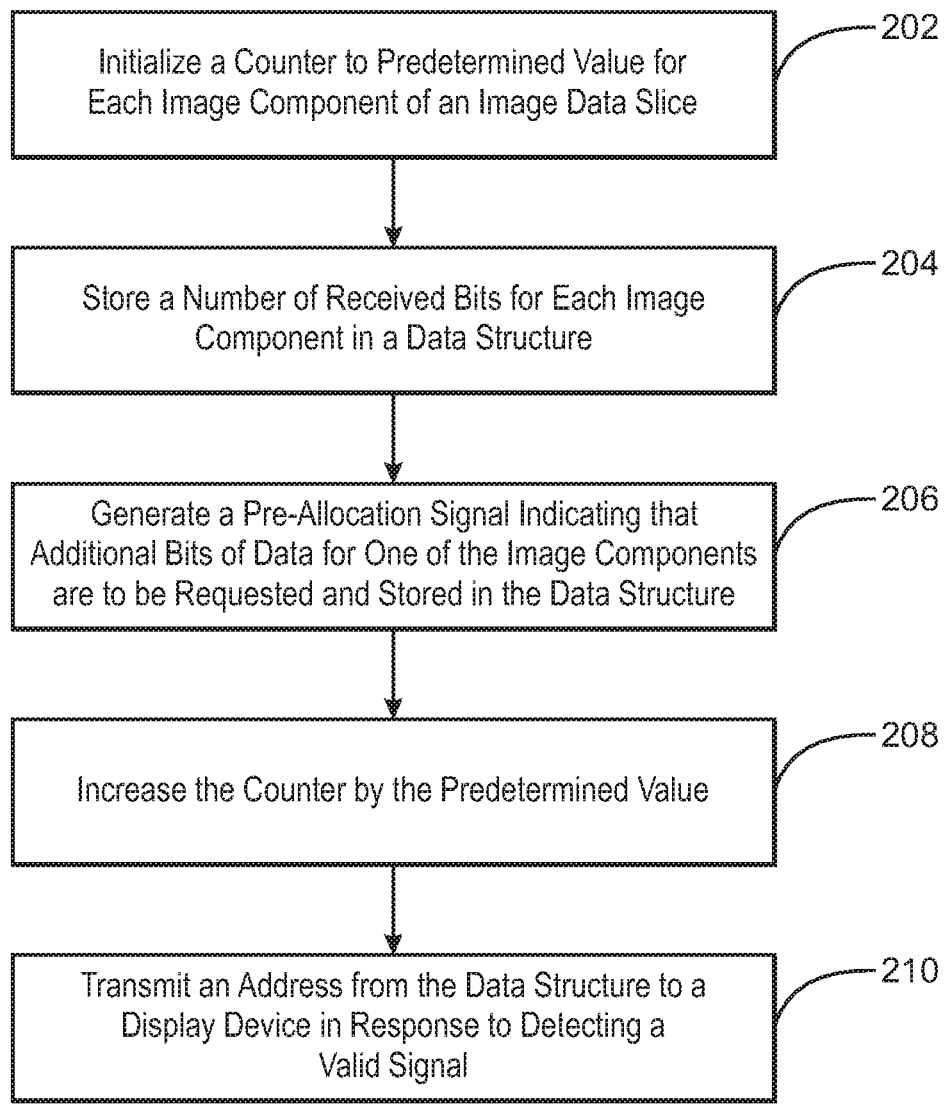
FIG. 2 is a process flow diagram of an example method for transmitting display data.

FIG. 2 is a process flow diagram of an example method for transmitting display data. The method 200 can be implemented with any suitable computing device such as computing device 100 of FIG. 1, among others.

At block 202, a microcontroller can initialize a counter to a predetermined value for each image component of an image data slice. For example, the microcontroller may initialize three counters, wherein each counter corresponds to luminance data values, chrominance green data values, and chrominance orange data values for a color space model of display data. In some embodiments, the microcontroller resides between a graphics processing unit and a display device port in a display interface. The counter can indicate a number of bits in a multiplexor word (also referred to herein as a mux word). A multiplexor word can include any suitable number of bits used to reference a memory address by a multiplexor. For example, the counter can be set to forty-eight bits, sixty-four bits, or any other suitable value.

In some embodiments, a data slice, as referred to herein, can include any suitable portion of an image or video frame. For example, a data slice can include any number of rows and columns of pixel values for an image. In some embodiments, each image or frame of video can be split into any number of data slices. In some embodiments, the number of data slices for an image is determined based on capabilities of a display device or a display interface.

In some embodiments, the luma, chrominance green, and chrominance orange components are converted from red, green, and blue pixel values using any suitable compression codec such as H.264, MPEG-4 AVC, and Dirac, among others. In some examples, the luma, chrominance green, and chrominance orange values are generated by multiplying red, green, and blue pixel values by any suitable matrix.

At block 204, the microcontroller can store a number of received bits for each image component in a data structure. The microcontroller can also reduce a counter based on the number of received bits. For example, the microcontroller can receive any number of bits corresponding to any of the image components from an entropy encoder. The microcontroller can detect the type of the image component, such as luma, chrominance orange, or chrominance green, and reduce the counter associated with the image component. An entropy encoder, as referred to herein, can include any suitable module of a display interface that can provide a lossless data compression scheme. In some embodiments, the data structure can be a first-in first-out queue that stores any number of values for luma, chrominance green, and chrominance orange image components. In some embodiments, the data structure is a modified queue, in which the lowest memory address in the queue corresponding to an image component is returned as output. For example, the lowest memory address corresponding to a luma, chrominance green, or chrominance orange image component may be returned as output from the data structure.

At block 206, the microcontroller can generate a pre-allocation signal indicating that additional bits of data for one of the image components are to be requested and stored in the data structure. In some examples, the pre-allocation signal is generated in response to determining that the counter is below the predetermined value. For example, the microcontroller can determine that a number of luma, chrominance green, and chrominance orange values are stored in the data structure. The microcontroller can determine based on a counter for each image component that additional bits are to be requested. For example, the microcontroller can determine that the number of stored values for luma, chrominance green, or chrominance orange image components is below a threshold. In some embodiments, the threshold is equal to the predetermined value or multiplexer word size for a system. In some examples, the microcontroller requests the additional bits from an entropy encoder.

In some embodiments, the microcontroller can pre-allocate image components based on a luminance, chrominance orange, and chrominance green ordering. For example, the microcontroller can determine an ordering of image components recognized by a display device and pre-allocate the image components following the recognized ordering. In some examples, the microcontroller can use a luma, chrominance orange, chrominance green ordering, or a chrominance green, chrominance orange, luma ordering, or any other suitable ordering.

At block 208, the microcontroller can also increase the counter by the predetermined value. For example, the microcontroller can detect a number of bits per multiplexor word and increase the counter by the number of bits in the multiplexor word for a system. In some embodiments, the microcontroller can increase the counter to reflect requested and received bits that have been stored in the data structure.

At block 210, the microcontroller can also transmit an address from the data structure to a display device in response to detecting a valid signal. As discussed above, an address can be universal and may not indicate whether the address corresponds to a particular image component. Accordingly, an address may store chrominance orange values, chrominance green values, or luma values. In some embodiments, the valid signal indicates that the microcontroller can transmit an address from the data structure to the display device. In some embodiments, the microcontroller 112 generates the valid signal when more than a multiplexor word of bits for an image component have been accumulated or when the end of a data slice is reached. The microcontroller may also determine that more than one multiplexor word of data values are valid to be transmitted. In some examples, the microcontroller can transmit a multiplexor word of values of an image component with a lowest memory address. A lowest memory address may indicate values that were first received and stored in the data structure.

In some embodiments, the microcontroller can store a zero value corresponding to an address when the end of a data slice is reached. For example, the microcontroller can transmit a zero value to the display device at the end of each data slice.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
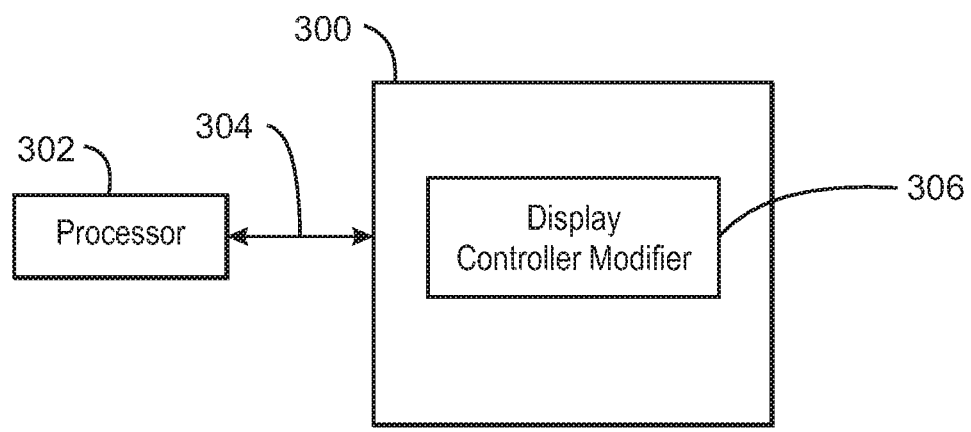
FIG. 3 illustrates a block diagram of a non-transitory computer readable media for transmitting display data.

FIG. 3 illustrates a block diagram of a non-transitory computer readable media for transmitting display data. The tangible, non-transitory, computer-readable medium 300 may be accessed by a processor 302 over a computer interconnect 304. Furthermore, the tangible, non-transitory, computer-readable medium 300 may include code to direct the processor 302 to perform the operations of the current method.

The various software components discussed herein may be stored on the tangible, non-transitory, computer-readable medium 300, as indicated in FIG. 3. For example, a display controller modifier 306 can initialize a counter to a predetermined value for each image component of an image data slice and store a number of received bits for each image component in a data structure, wherein the counter is to be reduced based on the number of received bits. The display controller modifier 306 can also generate a pre-allocation signal indicating that additional bits of data for one of the image components are to be requested and stored in the data structure, the pre-allocation signal to be generated in response to determining that the counter is below the predetermined value. The display controller modifier 306 can also increase the counter by the predetermined value and transmit an address from the data structure to a display device in response to detecting a valid signal.

It is to be understood that any suitable number of the software components shown in FIG. 3 may be included within the tangible, non-transitory computer-readable medium 300. Furthermore, any number of additional software components not shown in FIG. 3 may be included within the tangible, non-transitory, computer-readable medium 300, depending on the specific application.

Figure 4:
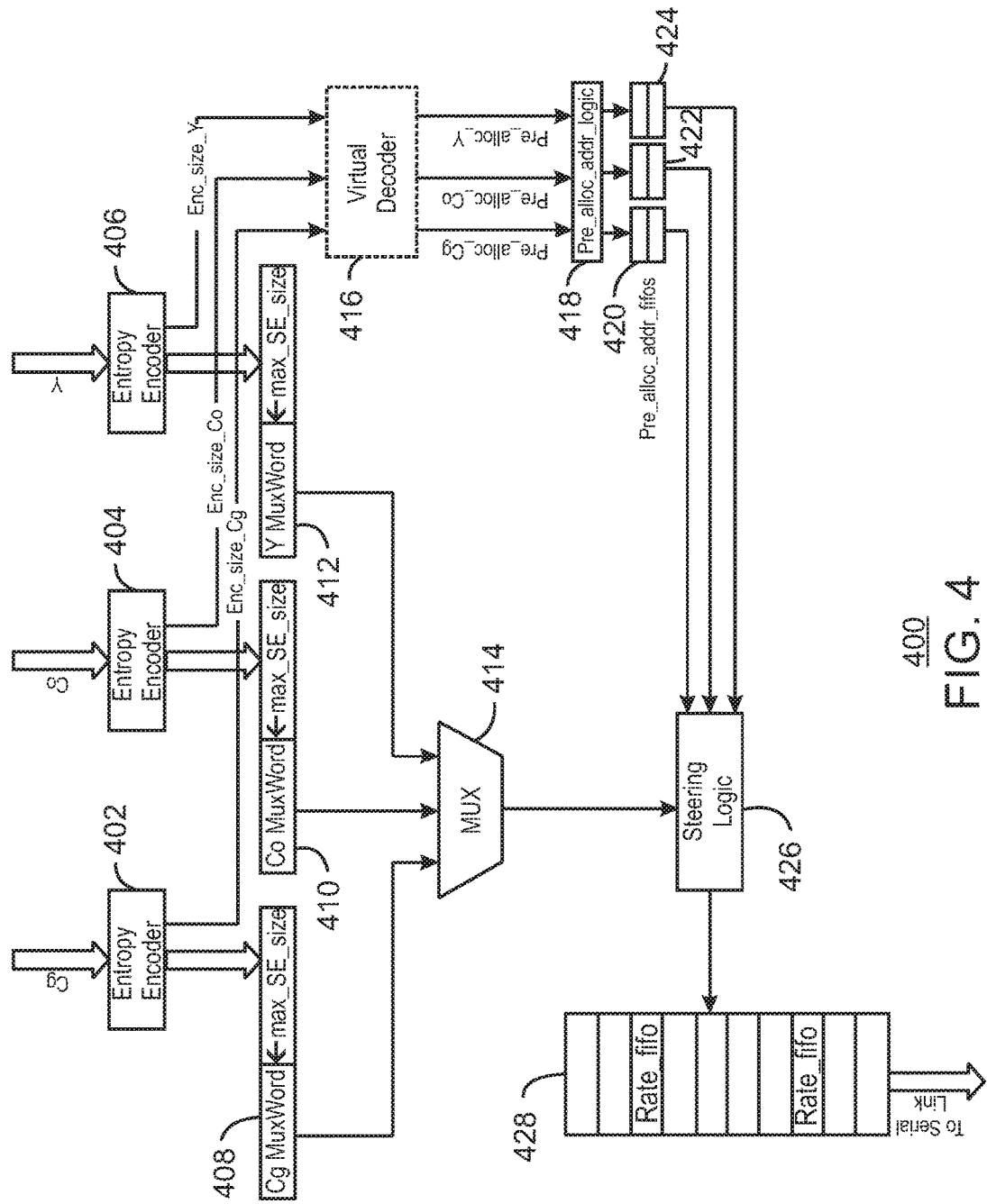
FIG. 4 is an example circuit diagram for transmitting display data.

FIG. 4 is an example circuit diagram for transmitting display data. The circuit diagram can correspond to any suitable circuit such as the microcontroller 112 of FIG. 1.

In some embodiments, a circuit 400 can include three entropy encoders 402, 404, and 406 which provide chrominance green (Cg) values, chrominance orange (Co) values, and luma (Y) values. In some embodiments, the entropy encoders 402, 404, and 406 accumulate chrominance green (Cg) values, chrominance orange (Co) values, and luma (Y) values until the values are equal to a multiplexor word or max_SE_size. A max_SE_size, as referred to herein, can indicate a number of bits used to represent an original red, green, or blue pixel from an image. The chrominance green (Cg) values 408, chrominance orange (Co) values 410, and luma (Y) values 412 can then be transmitted by the entropy encoders 402, 404, and 406 to a multiplexor 414.

In some embodiments, the entropy encoders 402, 404, and 406 can transmit a pre-allocation request corresponding to the chrominance green (Cg) values, chrominance orange (Co) values, or luma (Y) values to a virtual decoder 416. In some examples, the entropy encoders 402, 404, and 406 generate the pre-allocation request in response to detecting a number of bits stored for the chrominance green (Cg) values 408, chrominance orange (Co) values 410, and luma (Y) values 412 are less than a number of bits in a multiplexor word. In some embodiments, the virtual decoder 416 can transmit the chrominance green (Cg) values, chrominance orange (Co) values, and luma (Y) values received from the entropy encoders 402, 404, and 406 to a pre-allocation address logic 418. The pre-allocation address logic 418 can search for a lowest unassigned address and based on the type of image component that is requested for pre-allocation, assign an address to the requested image component and store the address in a data structure 420, 422, or 424. For example, the pre-allocation address logic 418 can assign an address to a chrominance orange, chrominance green, or luma value and store the address in data structure 420, 422, or 424 based on whether the address corresponds to a chrominance orange, chrominance green, or luma value. In some examples, the pre-allocation address logic 418 can store pre-allocated addresses in data structures, such as queues, which correspond to each image component. For example, the circuit 400 can include three queues 420, 422, and 424 that each store the pre-allocated addresses for the chrominance green (Cg) values, chrominance orange (Co) values, and luma (Y) values received from the entropy encoders 402, 404, and 406.

In some embodiments, steering logic 426 can receive pre-allocated addresses from the queues 420, 422, and 424, which can be combined with the chrominance green (Cg) values, chrominance orange (Co) values, and luma (Y) values received from the multiplexor 414. The steering logic 426 can store the combined values in a data structure 428, such as a queue (also referred to as a rate_FIFO). In some embodiments, the steering logic 426 can store values in the data structure 428 in accordance with various techniques, which may not include storing the values sequentially in the data structure 428. The lowest values stored in the data structure 428 can be transmitted to a sink source or display device through any suitable link such as a serial link. In some examples, the values transmitted from the data structure 428 to the sink device are based on an order of the chrominance green (Cg) values, chrominance orange (Co) values, and lama (Y) values recognized or supported by the sink device. In some examples, the circuit 400 transmits addresses stored in the data structure 428 using a sequential technique. For example, the circuit 400 may detect that the first three indices of the data structure 428 correspond to stored memory addresses. However, a fourth index of the data structure 428 may not yet include an address from the steering logic 426. In some embodiments, the circuit 400 can wait for the steering logic 426 to store an address in the fourth index of the data structure 428 before reading additional addresses in the data structure 428.

It is to be understood that the circuit diagram of FIG. 4 is not intended to indicate that the circuit 400 is to include all of the components shown in FIG. 4. Rather, the circuit 400 can include fewer or additional components not illustrated in FIG. 4.

Example 1

A system for transmitting display data can include a microcontroller that can initialize a counter to a predetermined value for each image component of an image data slice. The microcontroller can also store a number of received bits for each image component in a data structure, wherein the counter is to be reduced based on the number of received bits. Furthermore, the microcontroller can generate a pre-allocation signal indicating that additional bits of data for one of the image components are to be requested and stored in the data structure, the pre-allocation signal to be generated in response to determining that the counter is below the predetermined value. Additionally, the microcontroller can increase the counter by the predetermined value and transmit an address from the data structure to a display device in response to detecting a valid signal comprises.

Example 2

In the system of example 1, the microcontroller can determine that more than one of the image components is to be pre-allocated.

Example 3

In the system of example 2, the microcontroller can pre-allocate the image components based on a luminance, chrominance orange, chrominance ordering.

Example 4

In the system of example 1, the microcontroller can determine a number of bits in a multiplexor word and set the predetermined value to the number of bits in the multiplexor word.

Example 5

In the system of example 4, the multiplexor word can be forty-eight bits or sixty-four bits.

Example 6

In the system of example 1, the data structure can be a single first-in first-out queue that is to store the detected number of bits for the image components.

Example 7

In the system of example 6, the microcontroller can determine that more than one multiplexor word is valid to be transmitted.

Example 8

In the system of example 7, the microcontroller can transmit the address from the first-in first-out queue that comprises a lowest memory address.

Example 9

In the system of example 1, the microcontroller can store an accumulated multiplexor word received from an entropy encoder in the data structure in response to the valid signal.

Example 10

In the system of example 1, the image components can correspond to a luminance, a chrominance, and a chrominance orange for a color space model of the display data.

Example 11

A method for transmitting display data includes initializing a counter to a predetermined value for each image component of an image data slice. The method can also include storing a number of received bits for each image component in a data structure, wherein the counter is to be reduced based on the number of received bits. Furthermore, the method can include generating a pre-allocation signal indicating that additional bits of data for one of the image components are to be requested and stored in the data structure, the pre-allocation signal to be generated in response to determining that the counter is below the predetermined value. The method can also include increasing the counter by the predetermined value; and transmitting an address from the data structure to a display device in response to detecting a valid signal.

Example 12

In the method of example 11 the method can include determining that more than one of the image components is to be pre-allocated.

Example 13

In the method of example 12, the method can include pre-allocating the image components based on a luminance, chrominance orange, chrominance ordering.

Example 14

In the method of example 11, the method can include determining a number of bits in a multiplexor word and setting the predetermined value to the number of bits in the multiplexor word.

Example 15

In the method of example 14, the multiplexor word can be forty-eight bits or sixty-four bits.

Example 16

In the method of example 11, the data structure can be a single first-in first-out queue that is to store the detected number of bits for the image components.

Example 17

In the method of example 16, the method can include determining that more than one multiplexor word is valid to be transmitted.

Example 18

In the method of example 17, the method can include transmitting the address from the first-in first-out queue that comprises a lowest memory address.

Example 19

In the method of example 11, the method can include storing an accumulated multiplexor word received from an entropy encoder in the data structure in response to the valid signal.

Example 20

In the method of example 11, the image components can correspond to a luminance, a chrominance, and a chrominance orange for a color space model of the display data.

Example 21

A tangible, non-transitory computer readable medium for transmitting display data can include a plurality of instructions that in response to be executed by a processor, cause the processor to initialize a counter to a predetermined value for each image component of an image data slice. The plurality of instructions can also cause the processor to store a number of received bits for each image component in a data structure, wherein the counter is to be reduced based on the number of received bits. Furthermore, the plurality of instructions can cause the processor to generate a pre-allocation signal indicating that additional bits of data for one of the image components are to be requested and stored in the data structure, the pre-allocation signal to be generated in response to determining that the counter is below the predetermined value. Additionally, the plurality of instructions can cause the processor to increase the counter by the predetermined value and transmit an address from the data structure to a display device in response to detecting a valid signal comprises.

Example 22

In example 21, the plurality of instructions can cause the processor to determine that more than one of the image components is to be pre-allocated.

Example 23

A system for transmitting display data can include a microcontroller that can include means for initializing a counter to a predetermined value for each image component of an image data slice. The microcontroller can also include means for storing a number of received bits for each image component in a data structure, wherein the counter is to be reduced based on the number of received bits. Furthermore, the microcontroller can include means for generating a pre-allocation signal indicating that additional bits of data for one of the image components are to be requested and stored in the data structure, the pre-allocation signal to be generated in response to determining that the counter is below the predetermined value. Additionally, the microcontroller can include means for increasing the counter by the predetermined value and include means for transmitting an address from the data structure to a display device in response to detecting a valid signal comprises.

Example 24

In the system of example 23, the microcontroller can include means for determining that more than one of the image components is to be pre-allocated.

Example 25

In the system of example 24, the microcontroller can include means for pre-allocating the image components based on a luminance, chrominance orange, chrominance ordering.

Example 26

In the system of example 23, the microcontroller can include means for determining a number of bits in a multiplexor word and include means for setting the predetermined value to the number of bits in the multiplexor word.

Example 27

In the system of example 26, the multiplexor word can be forty-eight bits or sixty-four bits.

Example 28

In the system of example 23, the data structure can be a single first-in first-out queue that is to store the detected number of bits for the image components.

Example 29

In the system of example 28, the microcontroller can include means for determining that more than one multiplexor word is valid to be transmitted.

Example 30

In the system of example 29, the microcontroller can include means for transmitting the address from the first-in first-out queue that comprises a lowest memory address.

Example 31

In the system of example 23, 24, or 25, the microcontroller can include means for storing an accumulated multiplexor word received from an entropy encoder in the data structure in response to the valid signal.

Example 32

In the system of example 23, the image components can correspond to a luminance, a chrominance, and a chrominance orange for a color space model of the display data.

Example 33

A method for transmitting display data includes initializing a counter to a predetermined value for each image component of an image data slice. The method can also include storing a number of received bits for each image component in a data structure, wherein the counter is to be reduced based on the number of received bits. Furthermore, the method can include generating a pre-allocation signal indicating that additional bits of data for one of the image components are to be requested and stored in the data structure, the pre-allocation signal to be generated in response to determining that the counter is below the predetermined value. The method can also include increasing the counter by the predetermined value; and transmitting an address from the data structure to a display device in response to detecting a valid signal.

Example 34

In the method of example 33, the method can include determining that more than one of the image components is to be pre-allocated.

Example 35

In the method of example 34, the method can include pre-allocating the image components based on a luminance, chrominance orange, chrominance ordering.

Example 36

In the method of example 33, the method can include determining a number of bits in a multiplexor word and setting the predetermined value to the number of bits in the multiplexor word.

Example 37

In the method of example 36, the multiplexor word can be forty-eight bits or sixty-four bits.

Example 38

In the method of example 33, the data structure can be a single first-in first-out queue that is to store the detected number of bits for the image components.

Example 39

In the method of example 38, the method can include determining that more than one multiplexor word is valid to be transmitted.

Example 40

In the method of example 39, the method can include transmitting the address from the first-in first-out queue that comprises a lowest memory address.

Example 41

In the method of example 33, 34, or 35, the method can include storing an accumulated multiplexor word received from an entropy encoder in the data structure in response to the valid signal.

Example 42

In the method of example 33, the image components can correspond to a luminance, a chrominance, and a chrominance orange for a color space model of the display data.

Example 43

A tangible, non-transitory computer readable medium for transmitting display data can include a plurality of instructions that in response to be executed by a processor, cause the processor to initialize a counter to a predetermined value for each image component of an image data slice. The plurality of instructions can also cause the processor to store a number of received bits for each image component in a data structure, wherein the counter is to be reduced based on the number of received bits. Furthermore, the plurality of instructions can cause the processor to generate a pre-allocation signal indicating that additional bits of data for one of the image components are to be requested and stored in the data structure, the pre-allocation signal to be generated in response to determining that the counter is below the predetermined value. Additionally, the plurality of instructions can cause the processor to increase the counter by the predetermined value and transmit an address from the data structure to a display device in response to detecting a valid signal comprises.

Example 44

In example 43, the plurality of instructions can cause the processor to determine that more than one of the image components is to be pre-allocated.

Although an example embodiment of the disclosed subject matter is described with reference to block and flow diagrams in FIGS. 1-4, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A system for transmitting display data comprising:
a microcontroller to:
initialize a counter to a predetermined value for each image component of an image data slice;
store a number of received bits for each image component in a data structure, wherein the counter is to be reduced based on the number of received bits for each image component;
generate a pre-allocation signal indicating that additional bits of data for more than one of the image components are to be requested and stored in the data structure, the pre-allocation signal to be generated in response to determining that the counter is below the predetermined value, wherein the image components correspond to a luminance, a chrominance green, and a chrominance orange for a color space model of the display data, and wherein the image components are pre-allocated based on an ordering of the image components recognized by a display device, the ordering based on a lowest memory address assigned to each image component;
increase the counter by the predetermined value; and
transmit an address from the data structure to a display device in response to detecting a valid signal.

2. The system of claim 1, wherein the microcontroller is to determine a number of bits in a multiplexor word and set the predetermined value to the number of bits in the multiplexor word.

3. The system of claim 2, wherein the multiplexor word is forty-eight bits or sixty-four bits.

4. The system of claim 1, wherein the data structure is a single first-in first-out queue that is to store a detected number of bits for the image components.

5. The system of claim 4, wherein the microcontroller is to determine that more than one multiplexor word is valid to be transmitted.

6. The system of claim 5, wherein the microcontroller is to transmit the address from the first-in first-out queue that comprises a lowest memory address.

7. The system of claim 1, wherein the microcontroller is to store an accumulated multiplexor word received from an entropy encoder in the data structure in response to the valid signal.

8. The system of claim 1, wherein the processor is to store the received bits for each image component in a non-sequential order.

9. A method for transmitting display data comprising:
initializing a counter to a predetermined value for each image component of an image data slice;
storing a number of received bits for each image component in a data structure, wherein the counter is to be reduced based on the number of received bits for each image component;
generating a pre-allocation signal indicating that additional bits of data for more than one of the image components are to be requested and stored in the data structure, the pre-allocation signal to be generated in response to determining that the counter is below the predetermined value, wherein the image components correspond to a luminance, a chrominance green, and a chrominance orange for a color space model of the display data, and wherein the image components are pre-allocated based on an ordering of the image components recognized by a display device, the ordering based on a lowest memory address assigned to each image component;
increasing the counter by the predetermined value; and
transmitting an address from the data structure to a display device in response to detecting a valid signal.

10. The method of claim 9, comprising determining a number of bits in a multiplexor word and setting the predetermined value to the number of bits in the multiplexor word.

11. The method of claim 10, wherein the multiplexor word is forty-eight bits or sixty-four bits.

12. The method of claim 9, wherein the data structure is a single first-in first-out queue that stores a detected number of bits for the image components.

13. The method of claim 12, comprising determining that more than one multiplexor word is valid to be transmitted.

14. The method of claim 13, comprising transmitting the address from the first-in first-out queue that comprises a lowest memory address.

15. The method of claim 9, comprising storing an accumulated multiplexor word received from an entropy encoder in the data structure in response to the valid signal.

16. A tangible, non-transitory computer readable medium for transmitting display data comprising a plurality of instructions that in response to be executed by a processor, cause the processor to:
initialize a counter to a predetermined value for each image component of an image data slice;
store a number of received bits for each image component in a data structure, wherein the counter is to be reduced based on the number of received bits for each image component;
generate a pre-allocation signal indicating that additional bits of data for more than one of the image components are to be requested and stored in the data structure, the pre-allocation signal to be generated in response to determining that the counter is below the predetermined value, wherein the image components correspond to a luminance, a chrominance green, and a chrominance orange for a color space model of the display data, and wherein the image components are pre-allocated based on an ordering of the image components recognized by a display device, the ordering based on a lowest memory address assigned to each image component;
increase the counter by the predetermined value; and
transmit an address from the data structure to a display device in response to detecting a valid signal.

* * * * *